United States Patent [19]
Riggins et al.

[11] Patent Number: 6,131,116
[45] Date of Patent: *Oct. 10, 2000

[54] SYSTEM AND METHOD FOR GLOBALLY ACCESSING COMPUTER SERVICES

[75] Inventors: Mark D. Riggins, McLeansville, N.C.; R. Stanley Bailes, San Jose, Calif.; Hong O. Bui, Cupertino, Calif.; David I. Cowan, Menlo Park, Calif.; Daniel I. Mendez; Mason Ng, both of Mountain View, Calif.; Sean Michael Quinlan, San Francisco, Calif.; Prasad Wagle, Santa Clara, Calif.; Christine C. Ying, Foster City, Calif.; Christopher R. Zuleeg, San Jose, Calif.; Joanna A. Aptekar-Strober, Menlo Park, Calif.

[73] Assignee: Visto Corporation, Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,307

[22] Filed: Dec. 13, 1996

[51] Int. Cl.[7] .................................................... G06F 15/16
[52] U.S. Cl. ........................................... 709/219; 709/203
[58] Field of Search ........................ 395/200.33, 200.47, 395/200.57, 200.49, 200.59; 709/203, 217, 227, 229, 219

[56] References Cited

U.S. PATENT DOCUMENTS

| | | | |
|---|---|---|---|
| 4,831,582 | 5/1989 | Miller et al. | 707/104 |
| 5,220,603 | 6/1993 | Parker | 380/21 |
| 5,263,157 | 11/1993 | Janis | 707/9 |
| 5,581,749 | 12/1996 | Hossain et al. | 707/1 |

(List continued on next page.)

FOREIGN PATENT DOCUMENTS

| 2191505 | 6/1997 | Canada | H04M 3/42 |
|---|---|---|---|

OTHER PUBLICATIONS

Article by Bellovin et al., entitled: "Network Firewalls" Published by IEEE Communications Magazine Sep. 1994, pp. 50–57.

Article by Steffen Stempel, entitled: "IPAccess–An Internet Service Access System for Firewall Installations" Published by IEEE Communications Magazine Feb. 16, 1995, pp. 31–41.

Article by Braun et al., entitled: "Web Traffic Characterization: an assessment of the impact of caching documents from NCSA's web server" Published by Elsevier Science B.V. 1995 pp. 37–51.

Article by Nelson et al., entitled: "Security for Infinite Networks" Published by IEEE Communications Magazine on Aug. 22, 1995, pp. 11–19.

Article by Greenwald et al., entitled: "Designing an Academic Firewall: Policy, Practice, and Experience with SURF" Published by IEEE Communications Magazine on Feb. 22, 1996, pp. 79–92.

Article by Kiuchi et al., entitled: "C–HTTP—The Development of a Secure, Closed HTTP–based Network on the Internet" Published by IEEE Proceedings of SNDSS on Feb. 22, 1996, pp. 64–75.

(List continued on next page.)

Primary Examiner—Mehmet B. Geckil
Attorney, Agent, or Firm—Graham & James LLP

[57] ABSTRACT

A system for communicating through a computer network. The system includes a communications engine for establishing a communications link with a server, a browser, coupled to the communications engine, for receiving applet information corresponding to a service from the server, and an applet engine for using the applet information to control user interface I/O of the service. The communications engine may confirm user access privileges before establishing a communications link between the client and the server. The communications engine receives configuration data, and configures client attributes using the configuration data to provide a user-specific user interface to the client. It will be appreciated that the system may be stored on a floppy disk or hard drive.

43 Claims, 10 Drawing Sheets

U.S. PATENT DOCUMENTS

| | | | |
|---|---|---|---|
| 5,613,012 | 3/1997 | Hoffman et al. | 382/115 |
| 5,627,658 | 5/1997 | Connors et al. | 358/407 |
| 5,644,354 | 7/1997 | Thompson et al. | 348/13 |
| 5,657,390 | 8/1997 | Elgamal et al. | 380/49 |
| 5,666,553 | 9/1997 | Crozier | 395/803 |
| 5,682,478 | 10/1997 | Watson et al. | 395/200.12 |
| 5,682,524 | 10/1997 | Freund et al. | 395/605 |
| 5,684,990 | 11/1997 | Boothby | 707/203 |
| 5,701,423 | 12/1997 | Crozier | 395/335 |
| 5,706,502 | 1/1998 | Foley et al. | 395/610 |
| 5,715,403 | 2/1998 | Stefik | 705/44 |
| 5,754,830 | 5/1998 | Butts et al. | 3995/500 |
| 5,757,916 | 5/1998 | MacDoran et al. | 380/25 |
| 5,768,510 | 6/1998 | Gish | 395/200.33 |
| 5,778,346 | 7/1998 | Frid-Nielsen et al. | 395/208 |
| 5,784,463 | 7/1998 | Chen et al. | 380/21 |
| 5,784,464 | 7/1998 | Akiyama et al. | 380/25 |
| 5,802,530 | 9/1998 | Van Hoff | 707/513 |
| 5,812,668 | 9/1998 | Weber | 380/24 |
| 5,815,683 | 9/1998 | Vogler | 395/500 |
| 5,828,840 | 10/1998 | Cowan et al. | 395/200.33 |

OTHER PUBLICATIONS

Article by S. Cobb, entitled: "Establishing Firewall Policy" Published by National Computer Security Assn. on Jun. 25–27, 1996, pp. 198–205.

Tanenbaum, Andrew S., "Computer Network", Third Edition, Prentice–Hall 1996, ISBN 0–13–349945–6, Chapter 7, Sections 7.1.4 to 7.1.6, pp. 597–618.

Knudsen, Jonathan, "Java Cryptography", First Edition, O'Reilly & Assoc. 1998, ISBN 1–56592–402–9, pp. 79–91.

Web page: www.verisign.com/press/product/isv.html, Verisign Press Release, "Versign Enhances Digital IDS to Enable Universal Website Login and One–Step Registration", Nov. 3, 1998, 3 pages.

Mark Brown, "Using Netscape 2", Que Corporation, 1995, pp. 885–907.

Douglas Kramer, "The Java Platform," Javas–Soft, May 1996, pp. 1–25.

Package java.applet; java.net http://www–nrg.ee.lbl.gov/jef/apibook/javaf.htm javam.htm Apr. 22, 1996.

Servlet Tutorial http://mech.postech.ac.kr/Java/java.sun.com/products/jeeves/current release//doc/servlet–tutorial/servlet–tutorial.html Aug. 20, 1996.

FIG. 5
(Roam Page Screen Shot)

SYSTEM AND METHOD FOR GLOBALLY ACCESSING COMPUTER SERVICES

BACKGROUND OF THE INVENTION

1. Field of the Invention

This invention relates generally to computer networks, and more particularly to a system and method for globally accessing computer services.

2. Description of the Background Art

The internet currently interconnects about 100,000 computer networks and several million computers. Each of these computers stores numerous application programs for providing numerous services, such as generating, sending and receiving e-mail, accessing World Wide Web sites, generating and receiving facsimile documents, storing and retrieving data, etc.

A roaming user, i.e., a user who travels and accesses a workstation remotely, is faced with several problems. Program designers have developed communication techniques for enabling the roaming user to establish a communications link and to download needed information and needed service application programs from the remote workstation to a local computer. Using these techniques, the roaming user can manipulate the data on the remote workstation and, when finished, can upload the manipulated data back from the remote workstation to the local computer. However, slow computers and slow communication channels make downloading large files and programs a time-consuming process. Further, downloading files and programs across insecure channels severely threatens the integrity and confidentiality of the downloaded data.

The roaming user alternatively can carry a copy of all potentially needed information and all potentially needed application programs. However, maintaining a true copy of a database is a cumbersome process which often results in a data inconsistency problem. Therefore, a system and method are needed to enable multiple users to access computer services remotely without consuming excessive time, without severely threatening the integrity and confidentiality of the data, and without compromising data consistency.

SUMMARY OF THE INVENTION

The present invention provides a system and method for communicating through a computer network. The system includes a master server, service engines and clients, each equipped with a communication engine for establishing communications links. The system further includes a browser for receiving applet information corresponding to a service performed by one of the service engines from the server, and an applet engine for using the applet information to control user interface I/O of the service. The master server may confirm access privileges before allowing clients to access a service. The communications engine receives configuration data which are used to configure the client components such as the operating system, the web browser, the applets, etc. to enable communication with the service engine and to provide a user-specific user interface to the client. It will be appreciated that the system may be stored on a floppy disk or hard drive.

The method includes establishing a communications link between a client and a server, receiving applet information by the client from the server, establishing a communications link between the client and a service using the applet information, and directing user interface I/O control of the service to the client using the applet information. Establishing a communications link may include confirming access privileges. The method may further include receiving configuration data, and using the configuration data for configuring the client components such as the operating system, the web browser, the applets, etc. to enable communication with the service engine and to provide a user-specific user interface to the client.

The system and method use web browser technology to enable multiple users to access computer services remotely. Furthermore, the system and method use applet technology to enable users to access computer services without consuming excessive time, without severely threatening the integrity and confidentiality of the data, and without compromising data consistency. Still further, the system and method use configuration data to enable users to obtain a consistent interface from any remote terminal.

DETAILED DESCRIPTION OF THE PREFERRED EMBODIMENT

Figure 1:
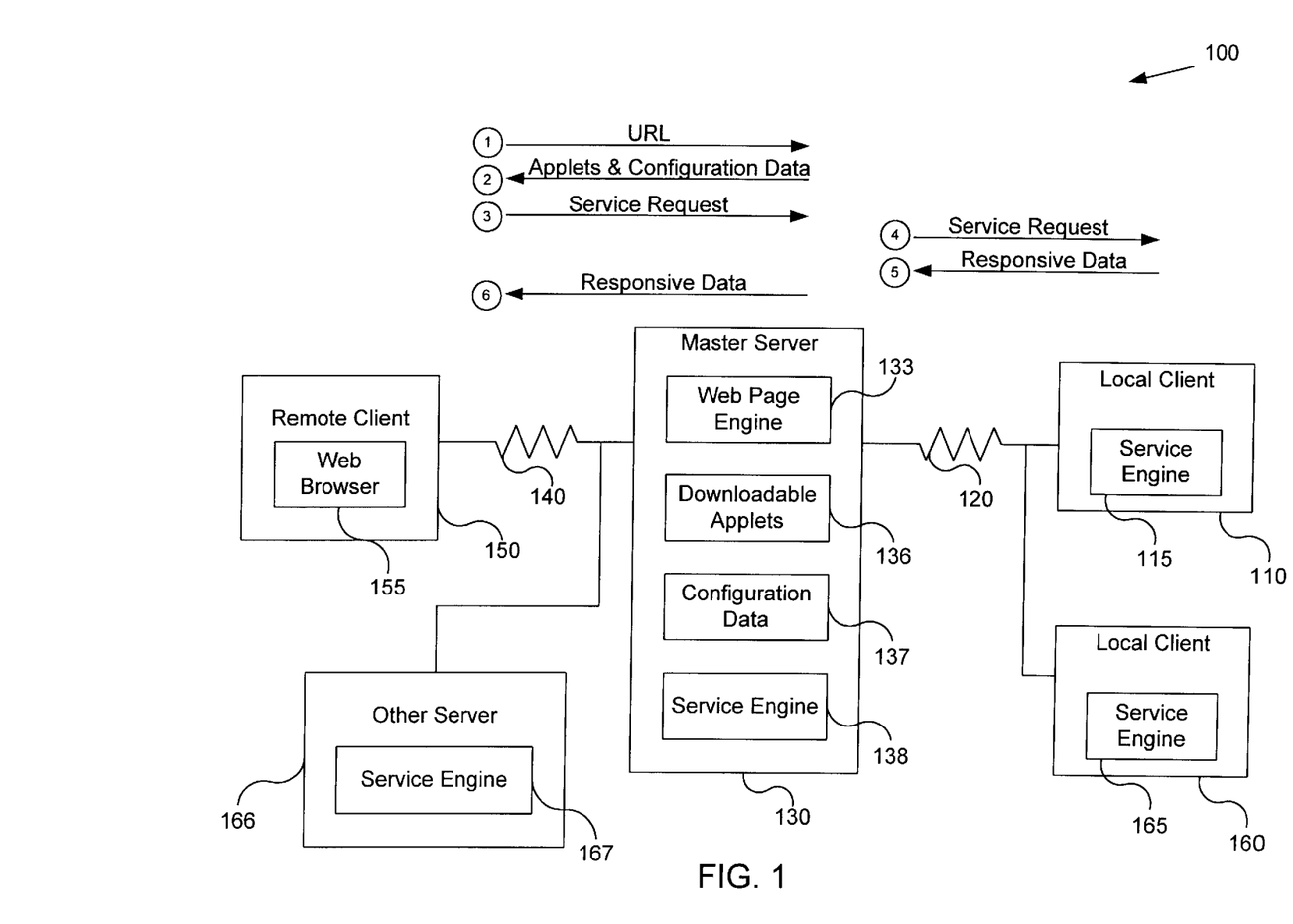
FIG. 1 is a block diagram illustrating a roaming-user network access system in accordance with the present invention.

FIG. 1 is a block diagram illustrating a roaming-user network access system 100, in accordance with the present invention. System 100 includes a network of computers, referred to herein as an "internet" 140, connected via a master server 130 to a local network 120. A first local client 110 and a second local client 160 are addressably connected via the local network 120 to the master server 130. A remote client 150 is connected via the internet 140 to the master server 130. Another server 166 is also connected via the internet 140 to the remote client 150, to the master server 130 and to the local clients 110 and 160.

The first local client 110 includes a first service engine 115 for providing a first computer service, such as calendaring, e-mail, paging, word-processing or the like, to a user. The second local client 160 includes a second service engine 165 for providing a second computer service to a user. Service engines 115 and 165 are described in greater detail with reference to FIG. 4. The remote client 150 includes a client engine, an example of which is an applet-based web browser 155 which is configured for communicating with the internet 140 and for reading and executing applets. Examples of web browsers 155 include the Netscape™ web browser produced by the Netscape Corporation, the Internet Explorer™ web browser produced by the Microsoft Corporation, or the Java™ Developers Kit 1.0 web browser produced by Sun Microsystems, Inc. While the illustrated client engine is a web browser 155, those skilled in the art will recognize that other client engines could be used in accordance with the present invention. Although the embodiment herein are being described with reference to the Java™ distributed environment produced by Sun Microsystems, Inc., "Downloadables" herein correspond to all downloadable and executable or interpretable programs for use in a distributed environment such as ActiveX™ controls in the ActiveX™ distributed environment produced by the Microsoft Corporation.

The master server 130 includes a web page engine 133 for maintaining and providing access to an internet web page which is enabled to forward applets 136 to the web browser 155 of the remote client 150. A user can select a particular service which corresponds to one of the applets 136, thereby causing the web browser 155 of the remote client 150 to initiate execution of the corresponding applet 130. Execution of the applet 130 causes the appropriate service engine 115 or 165 to execute the particular service or access an already executing service. It will be appreciated that executing a service may include directing Input/Output (I/O) control of a service application program, such as an e-mail application program, a paging application program or a word-processing application program, to the remote client 150 user.

The master server 130 further includes configuration data 137, which the remote client 150 can download to gain access to the desired service and to configure the functionality, look and feel of the web browser 155. The configuration data 137 may include operating system settings such as TCP protocol data and the domain name server address, user preferences, bookmarks, services, service addresses, etc. Each user preferably uploads unique configuration data 137 to the master server 130 in order to obtain similar functionality, look and feel from any web browser 155.

Similar to the local clients 110 and 160, the master server 130 may include a service engine 138 for providing access to a third computer service, and server 166 may include a service engine 167 for providing access to a fourth computer service. Service engines 138 and 166 are described in greater detail with reference to FIG. 4. From the remote client 150 user's standpoint, the location of the service engine does not matter.

As shown by line 1, the remote client 150 user inputs a predetermined Uniform Resource Locator (URL) address for opening the web page managed by the web page engine 133 of the master server 130. As shown by line 2, the web page engine 133 sends at least one of the applets 136 and web browser configuration data 137 to the web browser 155. From the services offered by the web page, the user selects a particular service corresponding to one of the applets 136. For example, to access e-mail services, the user selects an e-mail prompt corresponding to an e-mail applet 136.

As shown by line 3, the web browser 155 forwards to the master server 130 a service request for initiating execution of the selected service. As shown by line 4, the master server 130 determines the location of the service and sends the service request to the appropriate address, i.e., either to the service engine 115 of the local client 110, to the service engine 165 of the local client 160, to the service engine 138 of the master server 130 or to service engine 167 of the other server 166.

To initiate execution of the service request, the master server 130 may use servlets or agents. The appropriate service engine 115, 138, 165 or 167 executes the service and generates responsive data accordingly. As shown by line 5, the service engine 115, 138, 165 or 167 sends the responsive data back to the master server 130 and, as shown by line 6, the master server 130 sends the responsive data back to the remote client 150.

Since the master server 130 stores the applets 136 and the configuration data 137, the roaming user can access a service via any computer 110, 130, 150 or 160 which includes an applet-based web browser 155 and which is connected to the master server 130. Further, because the master server 130 maintains the network addresses of all services, the user need only maintain the URL address of the web page maintained by the web page engine 133. That is, the user need not maintain the current address of each service.

Although not shown in FIG. 1, a web browser 155 may be placed on a local client 110 or 160. A user can access the web page engine 133 from the local client 110 or 160 to take advantage of the services provided by the master server 130, by the server 166 or even by the local clients 110 or 160. For example, the local client user may access the web page engine 133 and select a particular service which resides on the local client 110. Accordingly, the applets 136 would launch the service on the local client 110 and would provide direct I/O control of the service to the user. Those skilled in the art will recognize that a particular service engine may require the services of other service engines. It will be appreciated that the local client user need not know the location of each service. The local client user need only access the master server 130.

Figure 2:
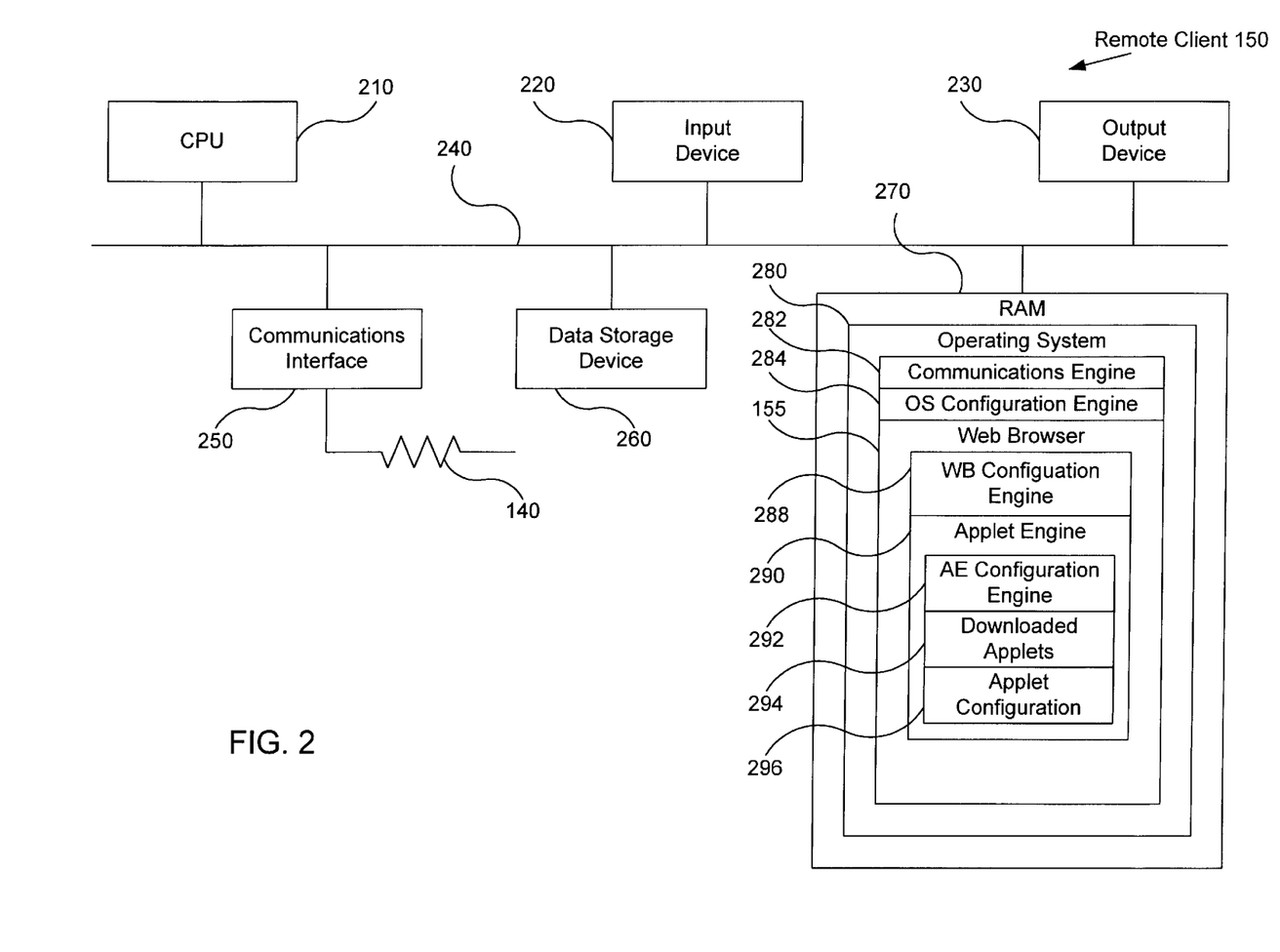
FIG. 2 is a block diagram illustrating details of the remote client of FIG. 1.

FIG. 2 is a block diagram illustrating details of the remote client 150, which includes a Central Processing Unit (CPU) 210 such as a Motorola Power PC® microprocessor or an Intel Pentium® microprocessor. An input device 220 such as a keyboard and mouse, and an output device 230 such as a Cathode Ray Tube (CRT) display are coupled via a signal bus 240 to CPU 210. A communications interface 250, a data storage device 260, such as Read Only Memory (ROM) and a magnetic disk, and a Random-Access Memory (RAM) 270 are further coupled via signal bus 240 to CPU 210. The communications interface 250 is coupled to the internet 140.

An operating system 280 includes a program for controlling processing by CPU 210, and is typically stored in data storage device 260 and loaded into RAM 270 for execution. Operating system 280 further includes a communications engine 282 for generating and transferring message packets to and from the internet 140 via the communications interface 250. Operating system 280 further includes an Operating System (OS) configuration engine 284, which configures the operating system 280 based on OS configuration data 137 such as TCP protocol data, domain name server addresses, etc. received from the master server 130.

Operating system 280 further includes a web browser 155 as described with reference to FIG. 1. The web browser 155 includes a Web Browser (WB) configuration engine 288, which configures the web browser 155 based on WB configuration data 137 such as home page addresses, bookmarks, caching data, user preferences, etc. received from the master server 130. The web browser further includes an applet engine 290 for handling the execution of downloaded applets 294. The applet engine 290 includes an Applet Engine (AE) configuration engine 292, which configures the applet engine 290 based on AE configuration data 137 received from the master server 130. The applet engine 290 further includes applet-specific configuration data 296 received from the master server 130. For example, for the e-mail applet 294, e-mail applet configuration data 296 may include a user's e-mail address, name, preferred signature block, as well as customizable user interface parameters.

Figure 3A:
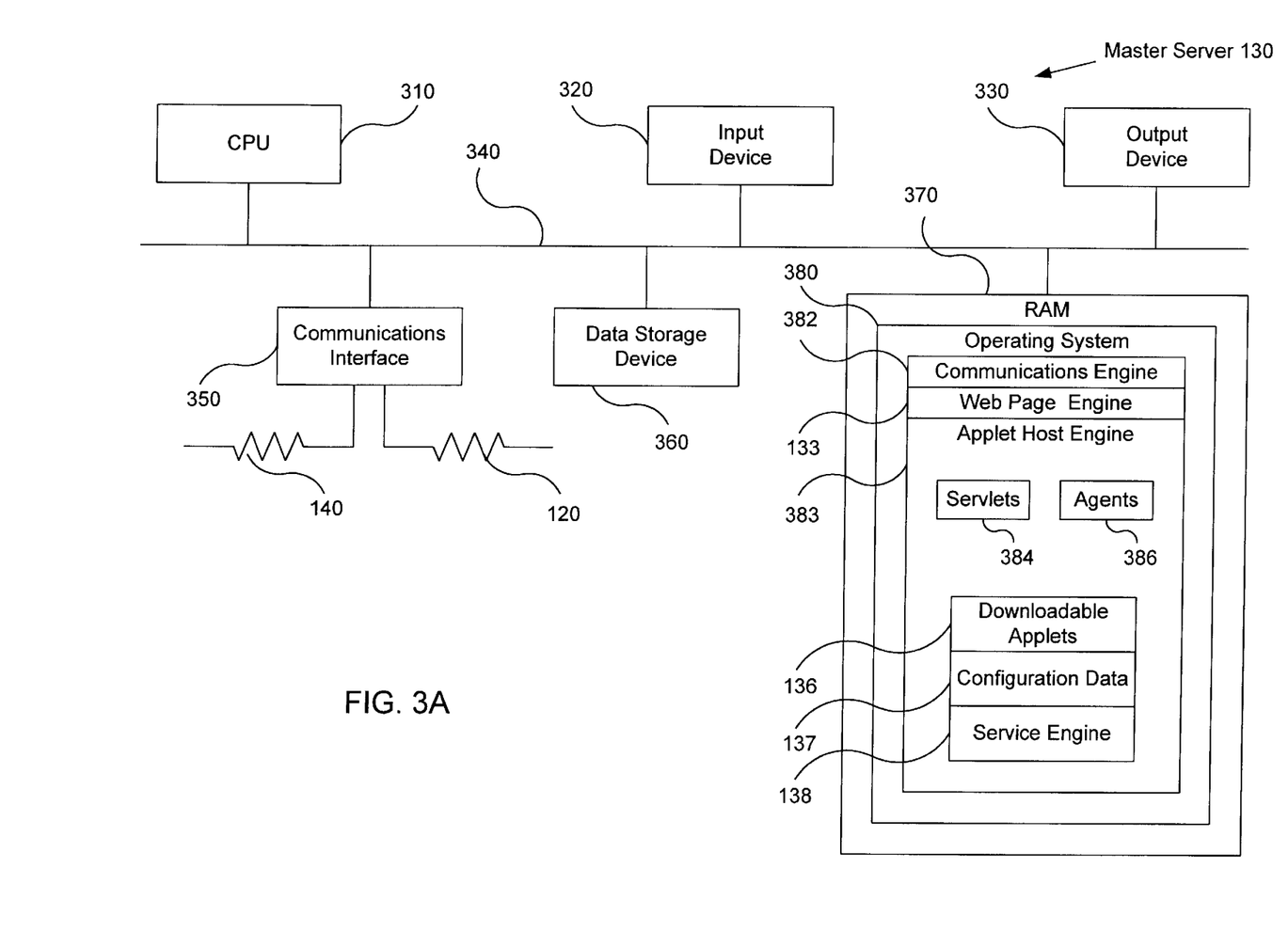
FIG. 3A is a block diagram illustrating details of the master server of FIG. 1.

FIG. 3A is a block diagram illustrating details of the master server 130, which includes a Central Processing Unit (CPU) 310 such as a Motorola Power PC® microprocessor or an Intel Pentium® microprocessor. An input device 320 such as a keyboard and mouse, and an output device 330 such as a Cathode Ray Tube (CRT) display are coupled via a signal bus 340 to CPU 310. A communications interface 350, a data storage device 360, such as Read Only Memory (ROM) and a magnetic disk, and a Random-Access Memory (RAM) 370 are further coupled via signal bus 340 to CPU 310. The communications interface 350 is coupled between the internet 140 and the local network 120.

An operating system 380 includes a program for controlling processing by CPU 310, and is typically stored in data storage device 360 and loaded into RAM 370 for execution. Operating system 380 further includes a communications engine 382 for generating and transferring message packets via the communications interface 350 to and from the internet 140 and to and from local network 120. Operating system 380 also includes a web page engine 133 for maintaining a web page and for forwarding the applets 136 and the configuration data 137 to the remote client 150.

Operating system 380 further includes an applet host engine 383 for managing and responding to the execution of downloaded applets 288. It will be appreciated that, to respond to the execution of the applets 288, the applet host engine 383 may execute corresponding servlets 384 or forward corresponding agents 386 for execution on the appropriate local client 110 or 160. Operating system 380 may further include the service engine 138 for providing the third service to the user. Service engine 138 is described in greater detail with reference to FIG. 4.

Figure 3B:
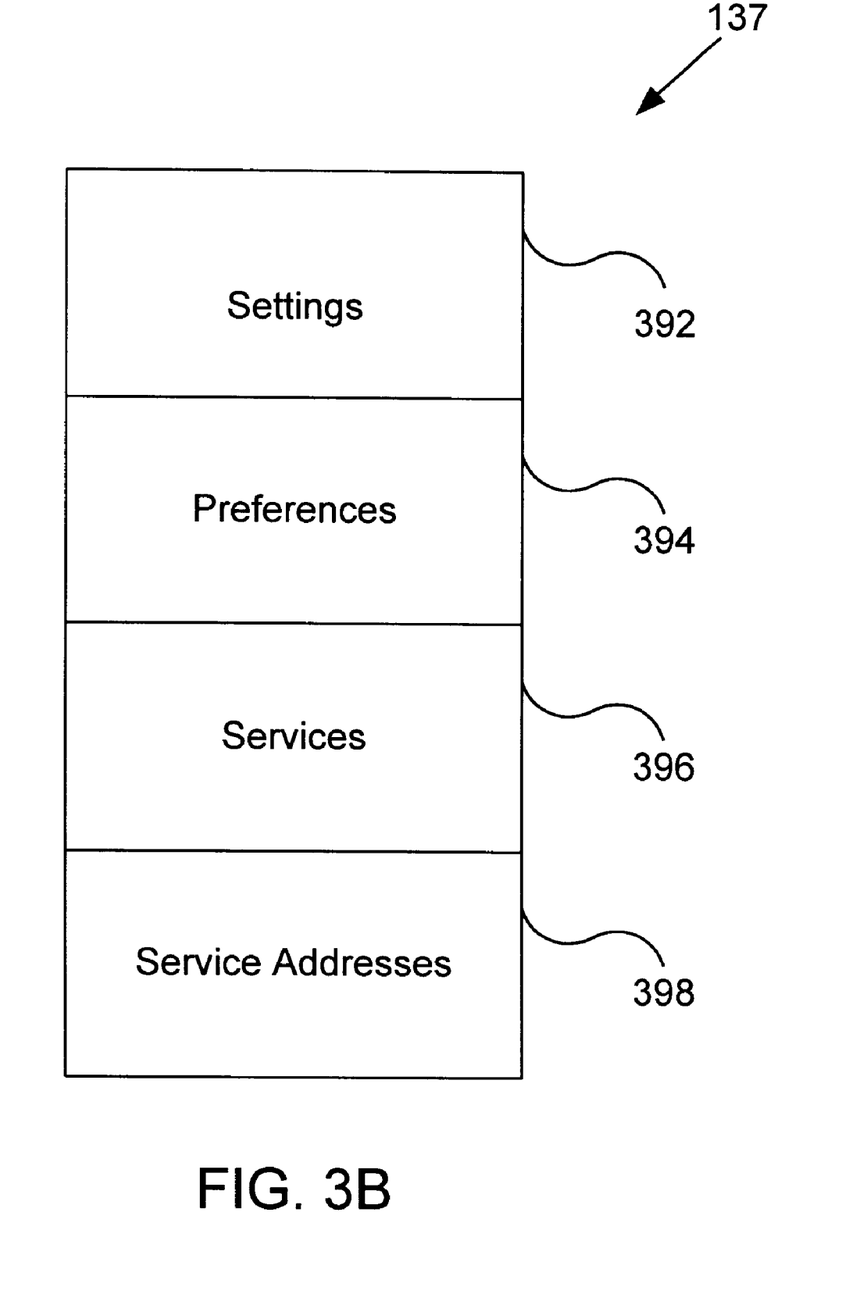
FIG. 3B is a block diagram illustrating details of the configuration data of FIG. 3A.

FIG. 3B is a block diagram illustrating details of the configuration data 137. Configuration data 137 includes operating system 280 settings 392 such as TCP protocol data and the domain name server address; web browser 155 settings 392 such as home page address, bookmarks and caching data; applet engine 290 settings 392; and applet configuration data 296 such as the user's e-mail address, name and signature block. It will be appreciated that applet-specific configuration data 296 is needed since the service may not be located on the user's own local client 110 or 160. Configuration data 137 further includes predetermined user preferences 394 such as font, window size, text size, etc.

Configuration data 137 further includes the services 396 which will be provided to the user. Services 396 include a list of registered user's and each user's desired services 396, which specify each user's set of downloaded applets 294. Configuration data 137 further includes service addresses 398 specifying the location of each of the services 396 accessible via the master server 130.

Figure 4:
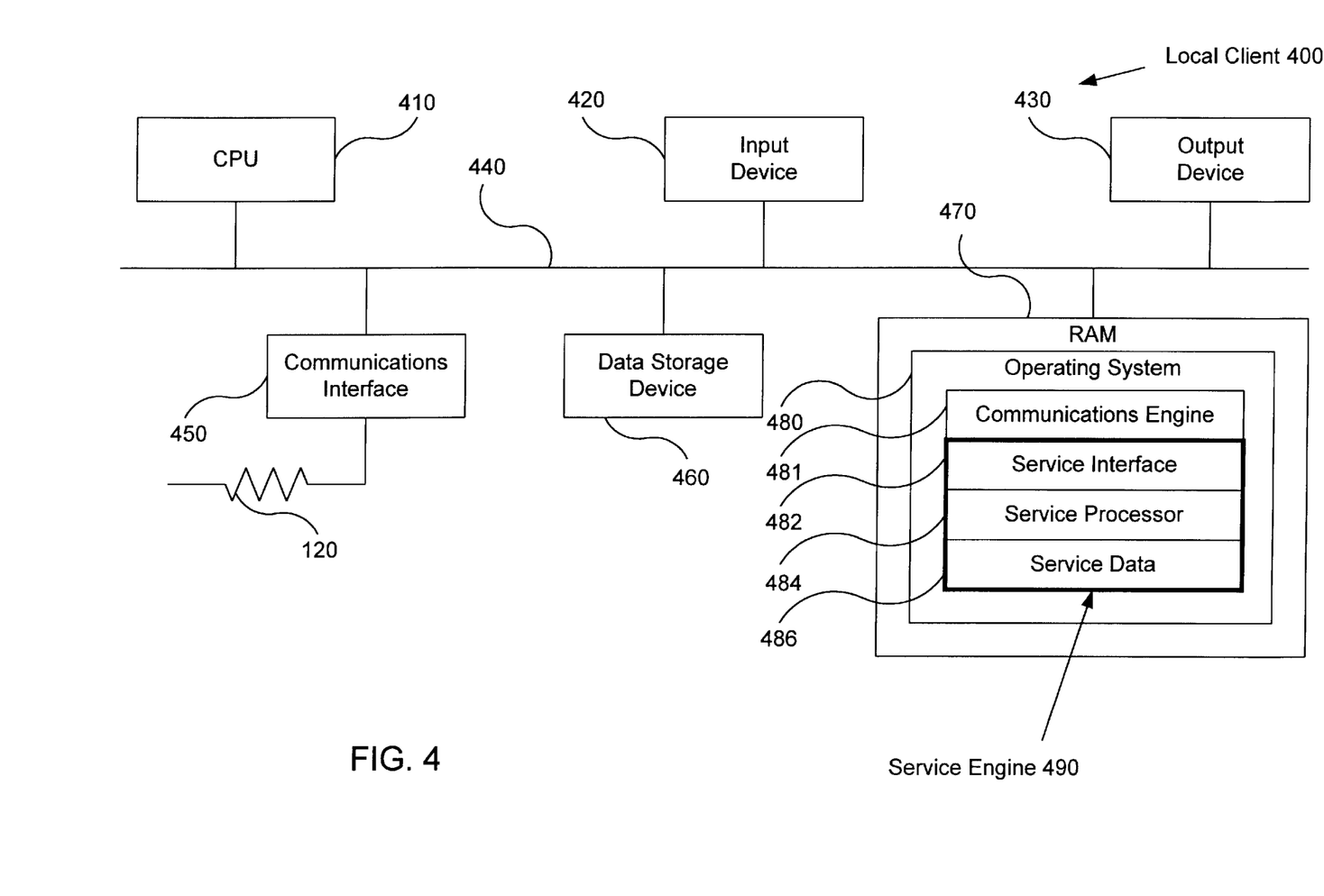
FIG. 4 is a block diagram illustrating details of each local client of FIG. 1.

FIG. 4 is a block diagram illustrating details of a local client 400, which includes a Central Processing Unit (CPU) 410 such as a Motorola Power PC® microprocessor or an Intel Pentium® microprocessor. Local client 400 is illustrative of local clients 110 and 160. An input device 420 such as a keyboard and mouse, and an output device 430 such as a Cathode Ray Tube (CRT) display are coupled via a signal bus 440 to CPU 410. A communications interface 450, a data storage device 460, such as Read Only Memory (ROM) and a magnetic disk, and a Random-Access Memory (RAM) 470 are further coupled via signal bus 440 to CPU 410. The communications interface 450 is coupled to the local network 120.

An operating system 480 includes a program for controlling processing by CPU 410, and is typically stored in data storage device 460 and loaded into RAM 470 for execution. Operating system 480 also includes a communications engine 481 for generating and transferring message packets via the communications interface 450 to and from the internet 140 and to and from local network 120. Operating system 480 further includes a service engine 490, which includes a service interface 482 for receiving and translating service requests generated by the applet 136 corresponding to the user-selected service, a service processor 484 and service data 484 for executing the service request. The service data 484 may include previously-generated documents, database information, etc. It will be appreciated that service engine 490 is similar to the service engine 115, 138, 165 or 167 of local client 110, of master server 130, of local client 160 or of other server 166. Those skilled in the art will recognize that operating system 480 may optionally include a web browser similar to web browser 155 as described with reference to FIG. 2, even though no web browser is shown within operating system 480.

Figure 5:
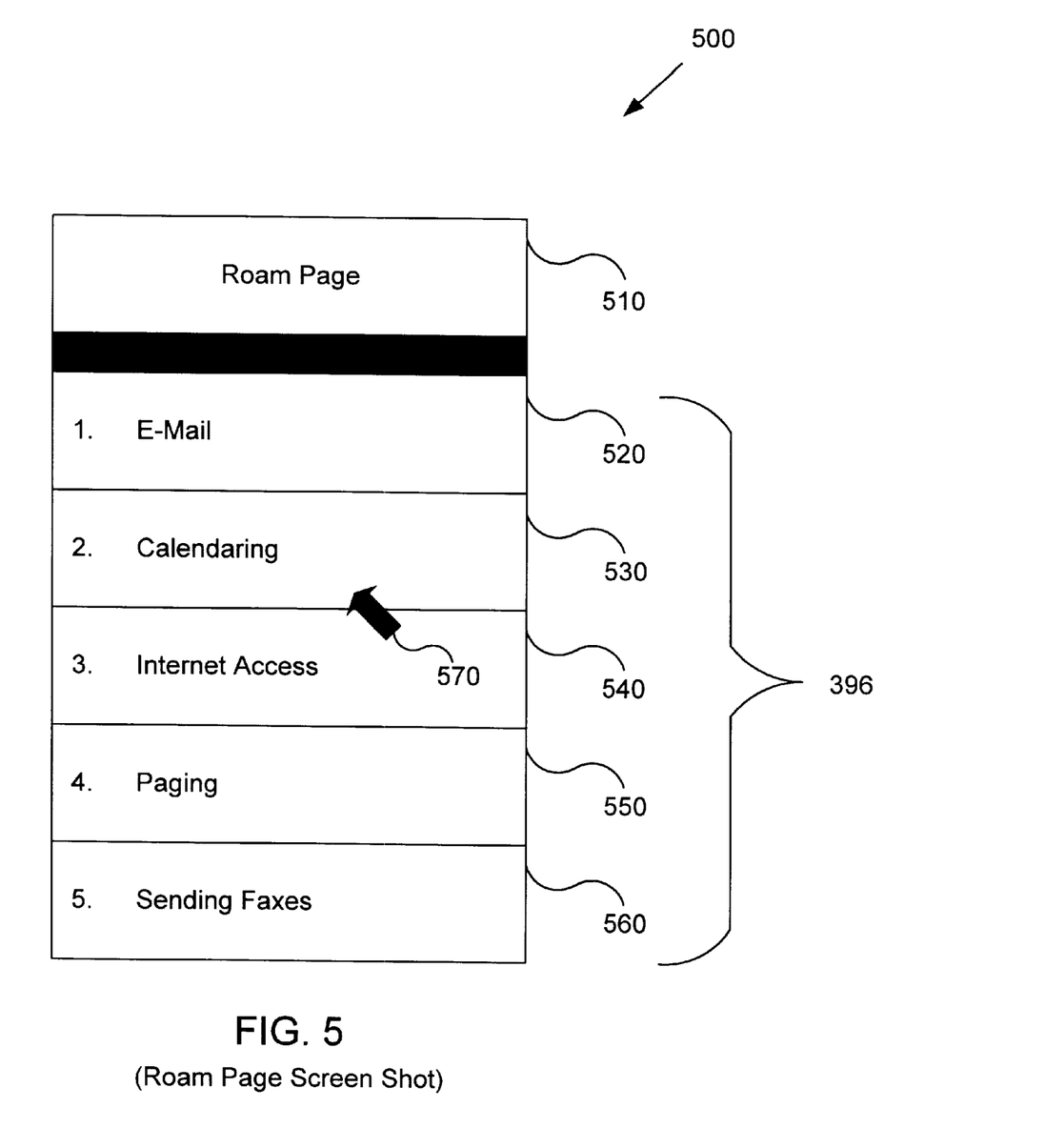
FIG. 5 illustrates an example graphical user interface of web page as maintained by the web page engine of FIG. 1.

FIG. 5 illustrates an example graphical user interface 500 of a URL-addressable HyperText Markup Language (HTML)-based web page, as maintained by the web page engine 133 of the master server 130. The graphical user interface 500 includes a title 510 "Roam Page," a listing of the provided services 396 and a pointer 570 for selecting one of the provided services 396. As illustrated, the provided services may include an e-mail service 520, a calendaring service 530, an internet access service 540, a paging service 550 and a fax sending service 560. Although not shown, other services such as bookmaking, QuickCard™, etc. may be included on the web page.

Figure 6:
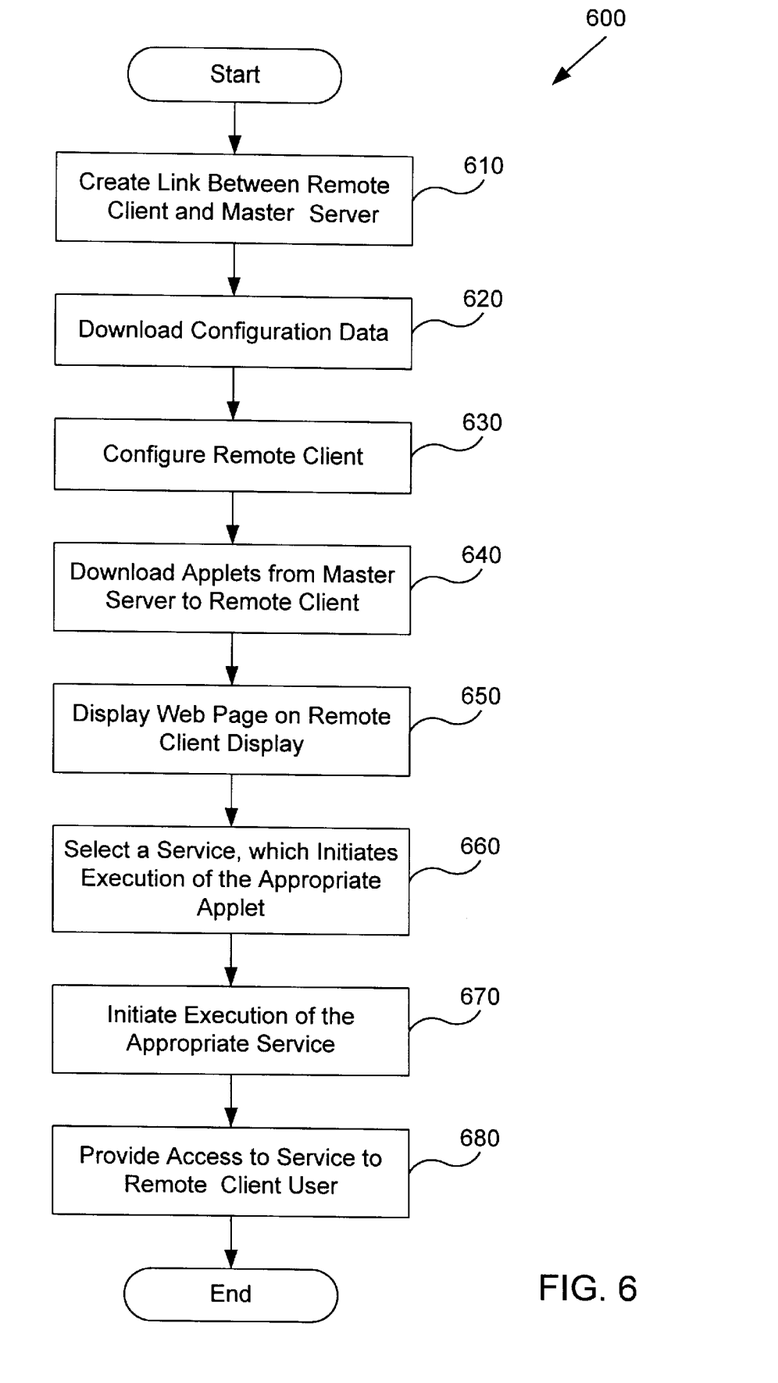
FIG. 6 is a flowchart illustrating a method for globally accessing a particular computer service.

FIG. 6 is a flowchart illustrating a method 600 for globally accessing a particular computer service. Method 600 begins with step 610 by the web browser 155 using a URL to open a communications link of the remote client 150 to the web page engine 133 of the master server 130. Upon opening the communications link, the web browser 155 in step 620 downloads configuration data 388 from the master server 130, which in step 630 the remote client 150 uses to configure itself. Step 630 includes using the OS configuration engine 282 to configure the operating system 280, using the WB configuration engine to configure the web browser 155, and using the AE configuration engine 288 to configure the applet engine 290.

The applet engine 290 of web browser 155 in step 640 downloads at least one applet 294 from the applets 136 of master server 130. Based on the configuration data 137 and on the downloaded applets 288, the web browser 155 in step 650 generates and displays a web page on the remote client output device 230. The remote client 150 user in step 660 can use the remote client input device 220 to select a particular one of the services 396 offered by the web page. Selection of a service causes the applet engine 290 to connect to or execute the applet 294 corresponding to the selected service 396.

The corresponding applet 294 in step 670 causes the appropriate service engine 490 to execute the selected service 396. Step 670 is described in greater detail with reference to FIGS. 7 and 8. The appropriate service engine 490 in step 680 executes the service request and accordingly provides service access to the remote client 150 user. Step 680 is described in greater detail with reference to FIG. 9.

Figure 7:
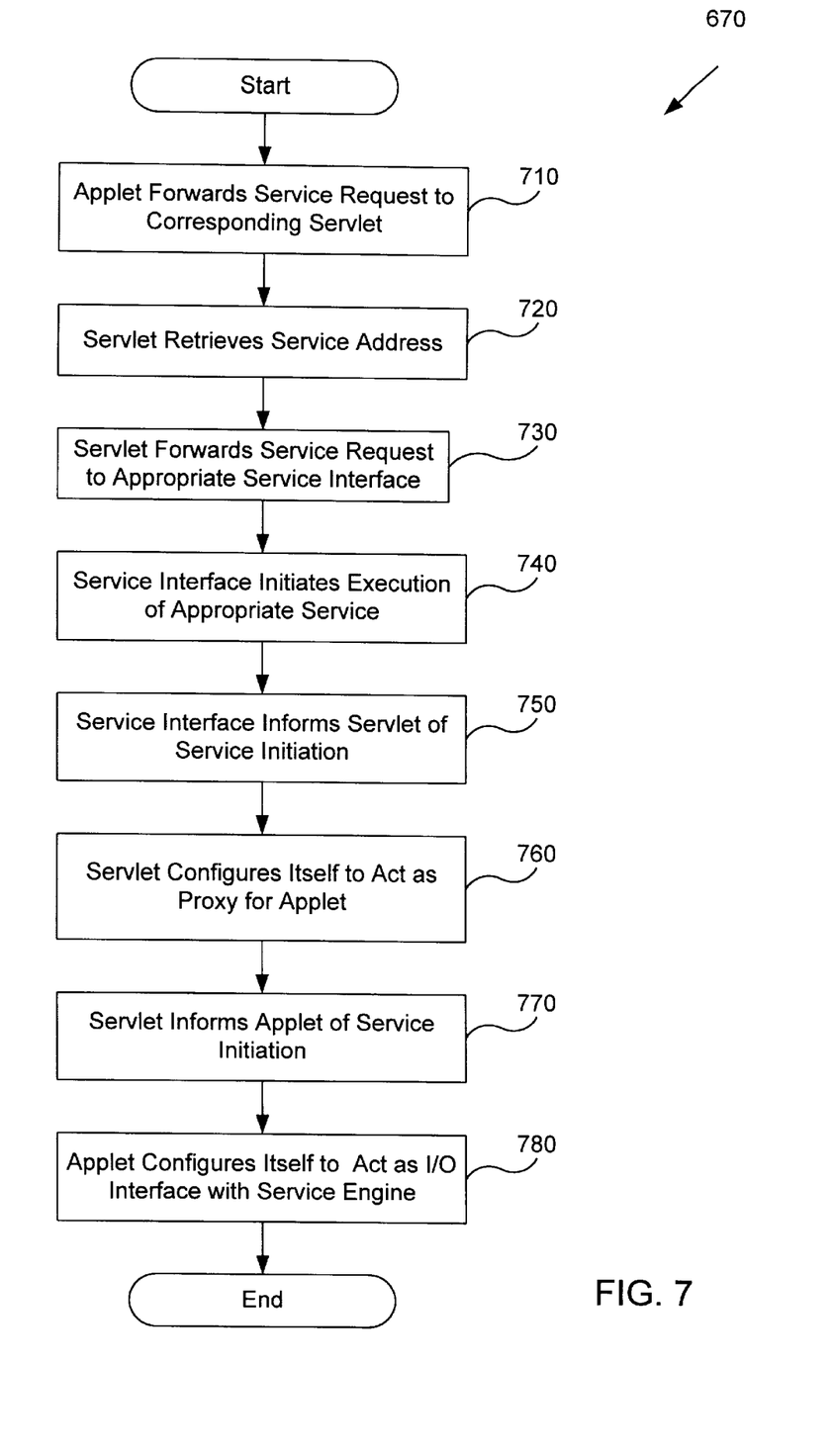
FIG. 7 is a flowchart illustrating details of the FIG. 6 step of initiating execution of a service on the local client.

FIG. 7 is a flowchart illustrating details of step 670, which begins with step 710 by the corresponding applet 294 forwarding a service request to a corresponding servlet 384 on master server 130. The servlet 384 in step 720 compares the service request with the service addresses 398 stored in the master server 130 to retrieve the service address 398 corresponding to the requested service 396. The servlet 384 in step 730 uses the service address 398 to forward the service request to the service interface 482 of the appropriate service engine 490. The service interface 482 in step 740 receives and initiates execution of the service 396 by the appropriate service engine 490.

The service interface 482 in step 750 informs the servlet 384 of the initiation of the service 396. Accordingly, the servlet 384 in step 760 acts as a proxy for the executing applet 294 and in step 770 informs the applet 294 of the initiation of the service 396. The applet 294 in step 780 acts as the Input/Output (I/O) interface to the service 396 (via the servlet 384). Acting as I/O interface includes using the remote client 150 output device 230 to display responsive data received from the service engine 490, using remote client 150 input device 220 to forward instructions to the service engine 490, and using the communications engine 282 and the communications interface 250 to packet and exchange data with the service engine 490.

Figure 8:
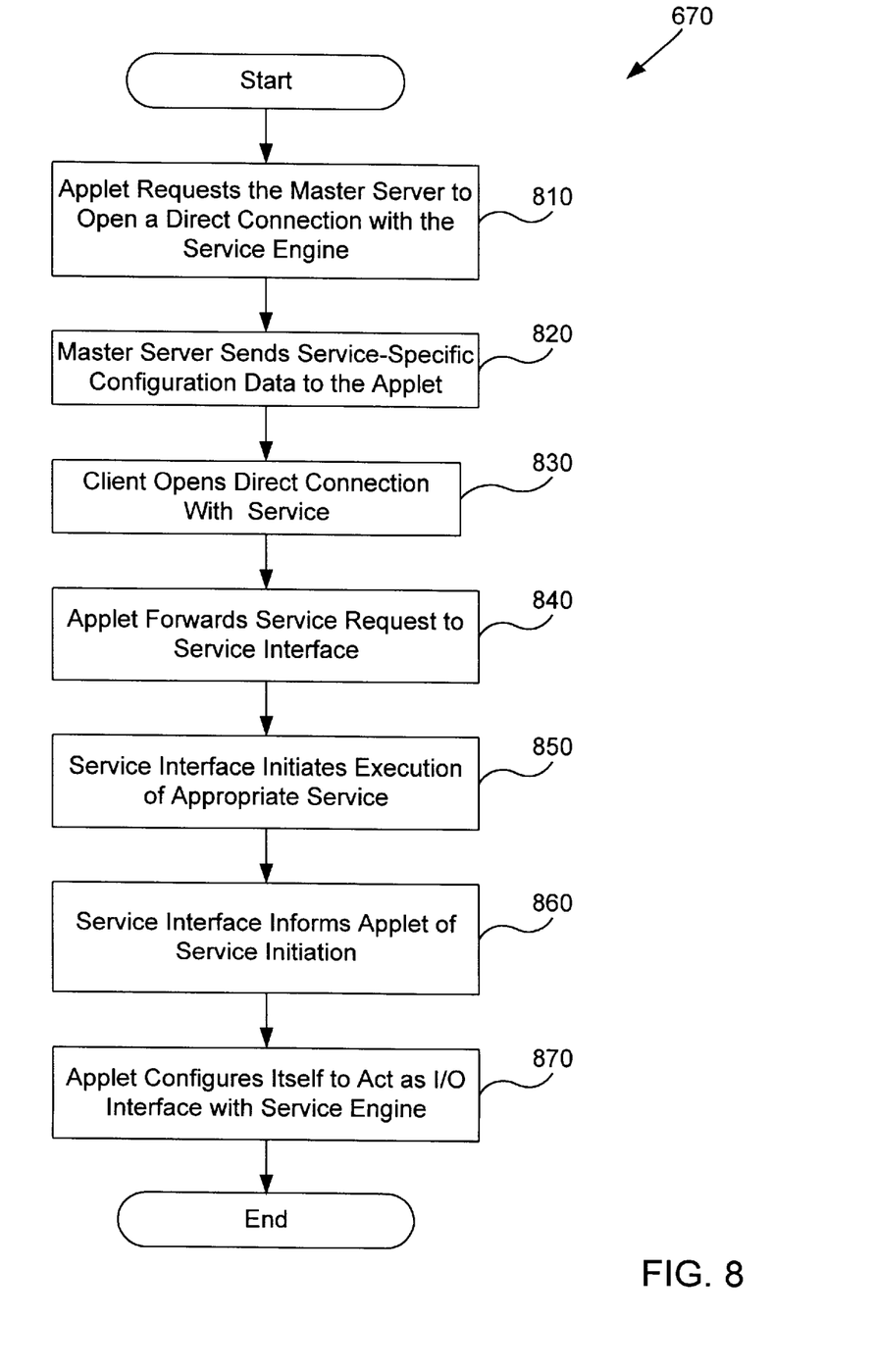
FIG. 8 is a flowchart illustrating alternative details of the FIG. 6 step of initiating execution of a service on the local client.

FIG. 8 is a flowchart illustrating alternative details of step 670, which begins with step 810 by applet 294 requesting the master server 130 to open a direct communications link with the appropriate service engine 490. The master server 130 in step 820 compares the service request with service addresses 398 stored in the master server 130 to retrieve the proper service address 398 and sends the service address and other service-specific configuration data to the applet 294. The remote client 150 in step 830 opens the direct link to the service.

When the direct connection has been established, the applet 294 in step 840 forwards the service request to the service interface 482 of the service engine 490. The service interface 482 in step 850 causes the service engine 490 to initiate execution of the requested service 396, and in step 860 informs the applet 294 of the initiation of the service 396 by the service engine 490. The applet 294 in step 870 acts as the I/O interface to the service 396.

Figure 9:
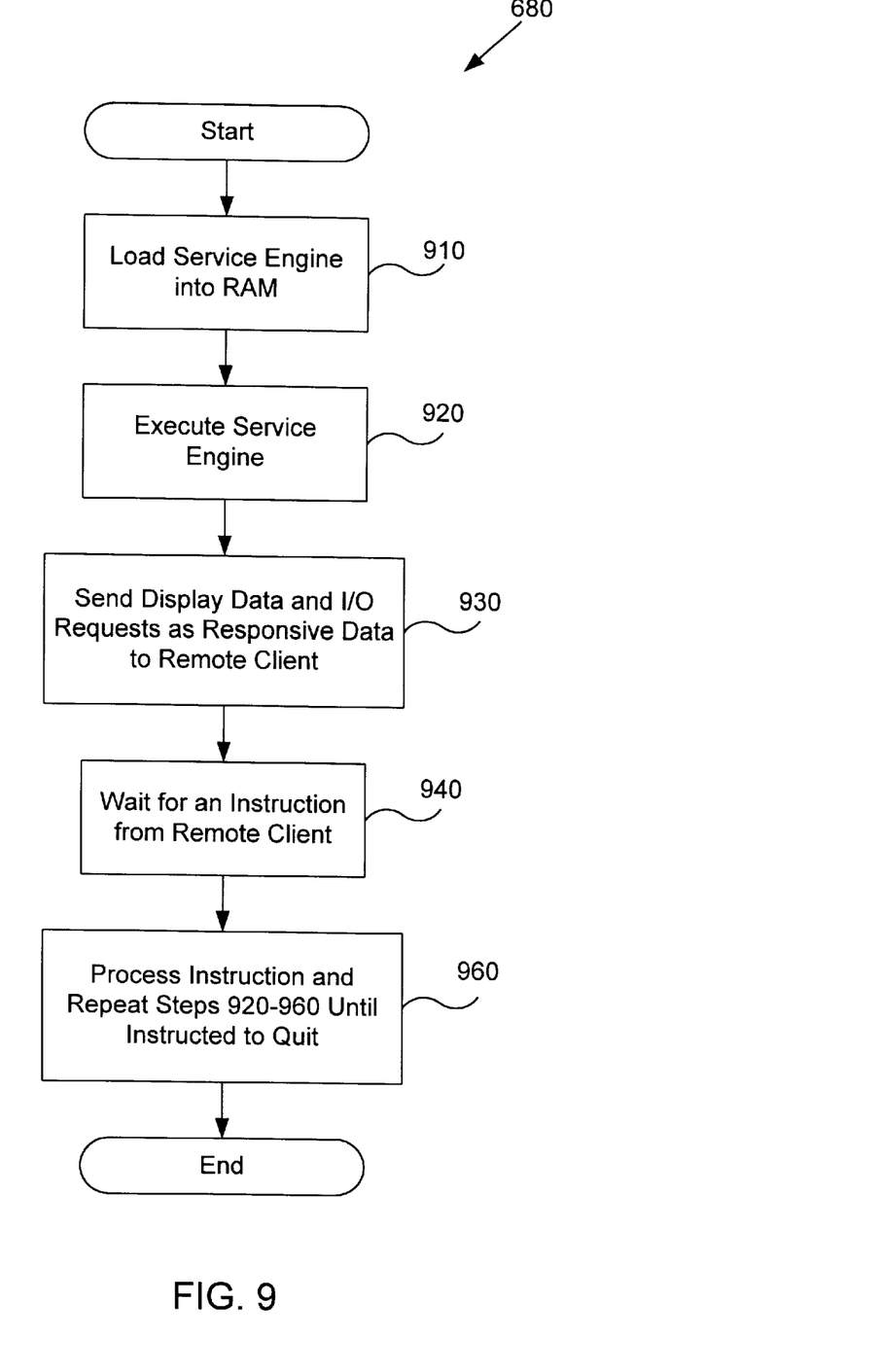
FIG. 9 is a flowchart illustrating details of the FIG. 6 step of providing service access to the remote client user.

FIG. 9 is a flowchart illustrating details of step 680, which begins with step 910 by the CPU 310 or 410 of the master server 130, the local client 110 or the local client 160 loading the respective service engine 490 into RAM 370 or 470. The CPU 310 or 410 in step 920 initiates execution of the service engine 490, which in step 930 processes the service request and accordingly generates and forwards display data and I/O requests as responsive data to the remote client 150. For example, if the user requests access to a database of information, the service engine 490 in step 930 will retrieve and send the requested data and a prompt for additional instructions back to the user. The service engine 490 in step 940 waits for instruction from the remote client 150 user. As illustrated by step 960, steps 920–960 repeat until the user instructs the system to quit.

For example, if a user wants to send an e-mail message to a colleague but maintains an e-mail application program and an e-mail address database only on his local work computer, then using the system of the present invention the user can operate the e-mail application program and can access the e-mail address database from a remote computer 150. That is, either a master server 130 or the local work computer 110 includes a web page engine 133 maintaining a roaming-access web page. The user locates a remote computer 150 operating an applet-enabled web browser 155, and inputs the roaming-access web page URL address.

The web page engine 133 confirms the user's access privileges. If access is granted, then the web browser 155 downloads information for displaying the web page, information for configuring the operating system 280 and the web browser 155 according to the user's predetermined specifications. The web browser 155 further downloads a predetermined set of service applets 294 which include an e-mail applet 294. The user selects the e-mail applet 294, for example, by clicking a mouse button while the mouse pointer 570 is over an e-mail applet prompt 520. Accordingly, the web browser 155 executes the e-mail applet 294, which includes retrieving the e-mail application program address 398 and sending an e-mail access service request to the service interface 482. The service interface 482 initiates the e-mail application program 484 and directs Input/Output (I/O) control to the remote computer 150 user.

The foregoing description of the preferred embodiments of the invention is by way of example only, and other variations of the above-described embodiments and methods are provided by the present invention. For example, although the remote client 150 of the has been described as a personal computer, the remote client 150 can alternatively be a Java™ workstation or a network computer. Although the remote client 150 has been described as downloading all selectable applets 294 from the master server 130, the remote client 150 can alternatively download selectable service prompts and can then download from the master server 130 only the applet corresponding to the selected service. Further, although the remote client 150 has been described as downloading all the configuration data 137 in one request, the remote client 150 may use several requests to download the configuration data 137. Still further, although services are described as being performed by one service engine 490, a service may be provided by multiple service engines 490. Still even further, components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. The system is limited only by the following claims:

What is claimed is:

1. A method comprising:
    initiating a communications link between a browser stored on a client and a server;
    receiving selection of a service identifier from a set of service identifiers;
    receiving Downloadable code corresponding to the selected service identifier from the server;
    using the Downloadable code to identify and initiate a network communications path from the browser to a service corresponding to the selected service identifier; and
    using the Downloadable code to interface with the service.

2. The method of claim 1, wherein the step of initiating a communications link between the browser and the server includes using a URL.

3. The method of claim 1, further comprising opening an internet protocol connection between the client and the server.

4. The method of claim 1, further comprising confirming user access privileges for communicating between the browser and the server.

5. The method of claim 1, further comprising receiving configuration data by the client; and configuring attributes of the client using the configuration data to provide a user-specific user interface to the client.

6. The method of claim 1, wherein using the Downloadable code to identify and initiate a network communications path includes accessing the service using a proxy.

7. The method of claim 1, wherein using the Downloadable code to interface with the selected service includes directing user interface I/O control of the selected service to a Downloadable code on the client.

8. A method comprising the steps of:
   initiating a communications link between a browser stored on a client and a server;
   forwarding identification information to the server;
   receiving configuration data corresponding to the identification information from the server;
   using a configuration engine and the configuration data to configure attributes of the client;
   initiating a communications link between the browser and a service using the configured client; and
   interfacing with the service using the configured client.

9. The method of claim 8, wherein initiating a communications link between the browser and the server includes using a URL.

10. The method of claim 8, further comprising opening an internet protocol connection between the client and the server.

11. The method of claim 8, further comprising confirming user access privileges for communicating between the client and the server.

12. The method of claim 8, further comprising providing a user-specific user interface to the client.

13. The method of claim 8, wherein initiating a communications link between the browser and the service includes accessing the service using a proxy.

14. The method of claim 8, wherein interfacing with the service includes directing user interface I/O control of the service to a Downloadable on the client.

15. A system comprising:
   means for initiating a communications link between a browser stored on a client and a server;
   means for receiving selection of a service identifier from a set of service identifiers;
   means for receiving Downloadable code corresponding to the selected service identifier from the server;
   means for using the Downloadable code to identify and initiate a network communications path from the browser to a service corresponding to the selected service identifier; and
   means for using the Downloadable code to interface with the service.

16. The system of claim 15, wherein the means for initiating a communications link between the browser and the server includes means for using a URL.

17. The system of claim 15, further comprising means for opening an internet protocol connection between the client and the server.

18. The system of claim 15, further comprising means for confining user access privileges for communicating between the client and the server.

19. The system of claim 15, further comprising
   means for receiving configuration data by the client; and
   means for configuring attributes of the client using the configuration data to provide a user-specific user interface to the client.

20. The system of claim 15, wherein the means for using the Downloadable code to identify and initiate a network communications path includes means for accessing the service using a proxy.

21. The system of claim 15, wherein the means for using the Downloadable code to interface with the selected service includes means for directing user interface I/O control of the selected service to a Downloadable on the client.

22. A system comprising:
   means for initiating a communications link between a browser stored on a client and a server;
   means for forwarding identification information to the server;
   means for receiving configuration data corresponding to the identification information from the server;
   means for using a configuration engine and the configuration data to configure attributes of the client;
   means for initiating a communications link between the browser and a service using the configured client; and
   means for interfacing with the service using the configured client.

23. The system of claim 22, wherein the means for initiating a communications link between the browser and the server includes means for using a URL.

24. The system of claim 22, further comprising means for opening an internet protocol connection between the client and the server.

25. The system of claim 22, further comprising means for confirming user access privileges for communicating between the client and the server.

26. The system of claim 22, further comprising
   means for receiving configuration data by the client; and
   means for configuring attributes of the client using the configuration data to provide a user-specific user interface to the client.

27. The system of claim 22, wherein the means for initiating a communications link between the browser and the service includes means for accessing the service using a proxy.

28. The system of claim 22, wherein the means for using the Downloadable code to interface with the service includes means for directing user interface I/O control of the service to a Downloadable on the client.

29. A computer-readable medium for storing a program for causing a computer to perform the steps of:
   initiating a communications link between a browser stored on a client and a server;
   receiving selection of a service identifier from a set of service identifiers;
   receiving Downloadable code corresponding to the selected service identifier from the server;
   using the Downloadable code to identify and initiate a network communications path from the browser to a service corresponding to the selected service identifier; and
   using the Downloadable code to interface with the service.

30. A computer-readable medium for storing a program for causing a computer to perform the steps of:
   initiating a communications link between a browser stored on a client and a server;
   forwarding identification information to the server;
   receiving configuration data corresponding to the identification information from the server;

using a configuration engine and the configuration data to configure attributes of the client;

initiating a communications link between the browser and a service using the configured client; and interfacing with the service using the configured client.

31. A system comprising:

web data for enabling a client to select a service identifier from a set of service identifiers;

a Downloadable for enabling the client to identify the network communications address of a service which corresponds to the selected service identifier and to control user interface I/O of the service;

a communications engine for downloading the Downloadable across a communications link to the client; and a host engine for initiating transmission of the Downloadable to the client based on the selection of the service identifier.

32. The system of claim 31, further comprising configuration data for configuring the client to provide the client with a consistent user interface for controlling the service.

33. The system of claim 31, wherein the communications engine establishes a communications link with the client across an internet.

34. The system of claim 31, wherein the communications engine confirms user access privileges for receiving communications from the client.

35. The system of claim 31, wherein the host engine provides a proxy service to direct user interface I/O control to the client.

36. A method, comprising:

receiving an access request from a browser stored on a remote client;

receiving user-identifying information from the browser; and transmitting to the browser configuration information based on the user-identifying information for configuring attributes of the remote client to establish a user-specific interface.

37. A method of communicating with a service, comprising:

requesting connection to a predetermined server by a browser stored on a remote client;

transmitting user-identifying information to the predetermined server;

receiving configuration code from the predetermined server responsive to the user-identifying information;

using the configuration code to configure the remote client;

requesting access to a service;

receiving Downloadable code corresponding to the requested service;

using the Downloadable code to establish a communications channel with the service; and using the Downloadable code and the configured remote client to communicate with the service.

38. The method of claim 37, wherein using the Downloadable code to establish a communications channel includes requesting connection to the selected service by the predetermined server.

39. The method of claim 38, wherein using the Downloadable to establish a communications channel includes using the Downloadable code to establish a communications channel with the predetermined server and using the predetermined server to establish a communications channel with the service, the predetermined server acting as proxy to the Downloadable code.

40. The method of claim 39, wherein using the predetermined server to establish a communications channel with the service includes executing a servlet.

41. The method of claim 37, wherein the Downloadable code includes the service address.

42. The method of claim 37, wherein using the Downloadable code and the configured client to communicate with the service includes using a server interface to communicate with the server by the Downloadable code and using a service interface to communicate with the service by the predetermined server.

43. The method of claim 37, wherein using the Downloadable code and the configured client to communicate with the service includes using a service interface to communicate directly with the service by the Downloadable code.

* * * * *

(12) EX PARTE REEXAMINATION CERTIFICATE (7531st)
United States Patent
Riggins et al.

(10) Number: US 6,131,116 C1
(45) Certificate Issued: May 25, 2010

(54) SYSTEM AND METHOD FOR GLOBALLY ACCESSING COMPUTER SERVICES

(75) Inventors: Mark D. Riggins, McLeansville, NC (US); R. Stanley Bailes, San Jose, CA (US); Hong O. Bui, Cupertino, CA (US); David I. Cowan, Menlo Park, CA (US); Daniel I. Mendez, Mountain View, CA (US); Mason Ng, Mountain View, CA (US); Sean Michael Quinlan, San Francisco, CA (US); Prasad Wagle, Santa Clara, CA (US); Christine C. Ying, Foster City, CA (US); Christopher R. Zuleeg, San Jose, CA (US); Joanna A. Aptekar-Strober, Menlo Park, CA (US)

(73) Assignee: Visto Corporation, Redwood Shores, CA (US)

Reexamination Request:
No. 90/010,498, Apr. 21, 2009

Reexamination Certificate for:
Patent No.: 6,131,116
Issued: Oct. 10, 2000
Appl. No.: 08/766,307
Filed: Dec. 13, 1996

(51) Int. Cl.
*G06F 15/16* (2006.01)

(52) U.S. Cl. ........................................ 709/519; 709/203
(58) Field of Classification Search .................. None
See application file for complete search history.

(56) References Cited

U.S. PATENT DOCUMENTS

| 5,768,510 | A | 6/1998 | Gish |
|---|---|---|---|
| 5,819,284 | A | 10/1998 | Farber et al. |
| 5,923,885 | A | 7/1999 | Johnson et al. |
| 5,968,131 | A | 10/1999 | Mendez et al. |
| 6,006,034 | A | 12/1999 | Heath et al. |
| 6,023,708 | A | 2/2000 | Mendez et al. |
| 6,047,327 | A | 4/2000 | Tso et al. |
| 6,085,192 | A | 7/2000 | Mendez et al. |
| 6,131,096 | A | 10/2000 | Riggins et al. |
| 6,708,221 | B1 | 3/2004 | Mendez et al. |
| 6,766,454 | B1 | 7/2004 | Riggins |
| 7,039,679 | B2 | 5/2006 | Mendez et al. |
| 7,225,231 | B2 | 5/2007 | Mendez et al. |
| 7,565,249 | B2 | 7/2009 | Kraemer et al. |
| 2006/0195595 | A1 | 8/2006 | Mendez et al. |
| 2007/0174433 | A1 | 7/2007 | Mendez et al. |

OTHER PUBLICATIONS

Anupam Joshi, et al., *Mowser: Mobile Platforms and Web Browsers*, Univ. of Purdue, Jan. 22, 1996, http://www.cs.purdue.edu/research/cse/publications/conf-journal/mowser.ps.gz.

GloMop Group, *GloMop: Global Mobile Computing By Proxy*, Univ. of Ca. at Berkely (Sep. 13, 1995).

*Primary Examiner*—Matthew Heneghan (57) ABSTRACT

A system for communicating through a computer network. The system includes a communications engine for establishing a communications link with a server, a browser, coupled to the communications engine, for receiving applet information corresponding to a service from the server, and an applet engine for using the applet information to control user interface I/O of the service. The communications engine may confirm user access privileges before establishing a communications link between the client and the server. The communications engine receives configuration data, and configures client attributes using the configuration data to provide a user-specific user interface to the client. It will be appreciated that the system may be stored on a floppy disk or hard drive.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 5 are cancelled.
Claims 2-4 and 6-43 were not reexamined.

* * * * *